United States Patent [19]

Lindsey

[11] Patent Number: 5,078,192
[45] Date of Patent: Jan. 7, 1992

[54] HIGH FLOTATION, LOW PRESSURE RADIAL TIRE

[75] Inventor: Sidney E. Lindsey, Houston, Tex.

[73] Assignee: Rubber Applicators, Inc., Houston, Tex.

[21] Appl. No.: 555,563

[22] Filed: Jul. 19, 1990

[51] Int. Cl.$^5$ .............................................. B60C 13/00
[52] U.S. Cl. ...................................... 152/555; 152/556
[58] Field of Search ............... 152/543, 546, 548, 550, 152/555, 556

[56] References Cited

U.S. PATENT DOCUMENTS

| 4,186,789 | 2/1980 | Verdier | 152/555 |
| 4,248,287 | 2/1981 | Christman | 152/548 |

FOREIGN PATENT DOCUMENTS

| 0001605 | 1/1987 | Japan | 152/555 |
| 0992631 | 5/1965 | United Kingdom | 152/555 |

Primary Examiner—Michael W. Ball
Assistant Examiner—Nancy T. Krawczyk
Attorney, Agent, or Firm—Bill B. Berryhill

[57] ABSTRACT

An improved high flotation, low pressure radial tire, the carcass of which is formed of one or more plies of radial tire cord, one or more plies of circumferential tire cord, and one or more plies of sidewall reinforcing tire cord forming a reinforcing annulus the major diameter of which is substantially the same as the major diameter of the sidewalls and the minor diameter of which is greater than the minor diameter of the sidewalls so that the reinforcing annulus terminates well short of the tire bead.

4 Claims, 4 Drawing Sheets

HIGH FLOTATION, LOW PRESSURE RADIAL TIRE

BACKGROUND OF THE INVENTION

1. Field of the Invention

The present application pertains to tire construction. Specifically, it pertains to construction of an improved radial tire. Even more specifically, it pertains to improved off-road, high flotation, low pressure tires of radial construction.

2. Brief Description of the Prior Art

Radial tires have been well accepted for many years for highway use on most vehicles. In addition, some radial tires have also been used for low speed, off-road vehicles, such as swamp buggies, logging vehicles, agricultural vehicles and the like. For swamp and logging vehicles, one type of tire frequently used is a high flotation, low pressure tire in which the width of the tire may be equal to or greater than its diameter. Such tires are typically mechanically clamped to a hub or wheel by means of a keeper ring so that they do not rely on internal air pressure to keep the tire bead seated on the hub or wheel. The recommended tire pressure for such a tire typically does not exceed fifteen psi and the speed of the vehicles on which they are used do not usually exceed twenty mph.

The carcass of a high flotation, low pressure tire of radial construction may be formed of a plurality of plies of radial cord extending from one of the tire beads, radially along an associated sidewall, along its cylindrical mid-section and radially along the other sidewall to the other tire bead and a plurality of plies of circumferentially disposed tire cord surrounding the substantially cylindrical mid-section. The radial plies are typically applied in strips of parallel (side-by-side) tire cords encapsulated or calendered in rubber. As indicated, the tire cords are parallel and adjacent to each other with typically eighteen to twenty two cords per inch of width. Generally no woven tire cord is used in the industry because with such construction the cords tend to cut on each other during flexure and may also result in minute voids in the rubber where cords cross and contact each other. Both of these conditions could contribute to tire failure.

At least one off-road tire of the high flotation, low pressure radial construction type is shown in U.S. Pat. No. 4,589,460. While such tires function well from a support, stability, flexibility and general wear standpoint, they are not without some problems. Because of the way the radial plies are applied and due to the great amount of flexure thereof, the sidewalls of such a tire are, under severe service conditions, somewhat susceptible to punctures, fractures, radial rips and the like due to rocks, stumps and other obstacles with which these sidewalls may come in contact. Thus, it is possible that an expensive high flotation, low pressure radial tire may become useless even though, from a general wear standpoint, it may have many hours of service life left therein.

SUMMARY OF THE PRESENT INVENTION

In the present invention, an improved high flotation, low pressure radial tire is provided in which puncture susceptible portions of the sidewalls thereof are uniquely reinforced to provide additional protection against rupture of the sidewalls from punctures, ruptures, fractures, radial rips and the like. The tire is formed with a cylindrical mid-section at opposite ends of which are annular sidewalls terminating in circular tire beads for mounting the tire on a hub for rotation about a longitudinal axis. The tire is formed of a tire carcass which includes one or more radial plies of tire cord extending from one bead and its associated sidewall, along the tire's cylindrical mid-section and along the other sidewall to the other of the beads; and, one or more circumferential plies of tire cord surrounding the tire's mid-section. This portion of the construction is known in the prior art. In addition, however, one or more plies of sidewall reinforcing tire cord, the cord of which is disposed is a generally circular side-by-side relationship to form a reinforcing annulus is affixed around the sidewalls to provide additional protection against rupture of the sidewalls from punctures, fractures, radial rips and the like. The major diameter of this reinforcing annulus is substantially the same as the major diameter of the sidewalls. The minor diameter of the reinforcing annulus is greater than the minor diameter of the sidewalls so that the reinforcing annulus terminates well short of the tire beads. In fact, the radial width of the reinforcing annulus is preferably fifty to eighty percent of the radial width of the annular sidewalls (where the hazards are). This is an extremely important feature. Since the reinforcing annulus terminates well short of the tire beads, the reinforcing annulus, while providing additional protection against rupture of the sidewalls from punctures, fractures, radial rips and the like, does not materially inhibit flexure of the sidewalls (particularly near the beads), a highly valued characteristic of high flotation, low pressure radial tires.

In a preferred embodiment, the cord of the sidewall reinforcing annulus is one or more cords wound in a continuous spiral, with uniform space between cords to allow for rubber encapsulation, from the minor diameter of the reinforcing annulus to its major diameter. Other embodiments are disclosed in which the reinforcing tire cord is made up of one or more strips of uniformly calendered side by side cord, the strips being applied in a spiral pattern or in a concentric circle pattern from the minor diameter of the reinforcing annulus to its major diameter. In still another embodiment, additional plies of reinforcing tire cord are added in a biased arrangement, extending from near the minor diameter of one of the reinforcing annuli, along its associated sidewall, across the tire mid-section and along the other of the sidewalls to near the minor diameter of the other reinforcing annuli. The ends of the biased reinforcing plies, like the reinforcing annuli, terminate well short of the tire bead so as not to inhibit flexure of the sidewalls or to materially alter the characteristics of a radial tire.

Thus, the present invention provides a high flotation, low pressure tire of radial construction with greatly reinforced sidewalls, especially suitable for severe service conditions encountered by off-road vehicles. The reinforcement of the sidewalls is provided by unique reinforcing plies which are not tied to the tire bead, terminating well short thereof, so as not to materially alter the desirable characteristics of a radial tire. However, the reinforcement provided to the damage susceptible areas of the sidewall result in increased sidewall penetration resistance, significantly better than prior art designs. Thus, failures due to punctures, fractures, radial rips and the like are substantially reduced. Since such a tire is usually relatively expensive, a great deal of money may be saved by prolonging the life of the tire. Many other objects and advantages of the invention will be understood from reading the description which follows in conjunction with the accompanying drawings.

DESCRIPTION OF THE PREFERRED EMBODIMENTS

Figure 1:
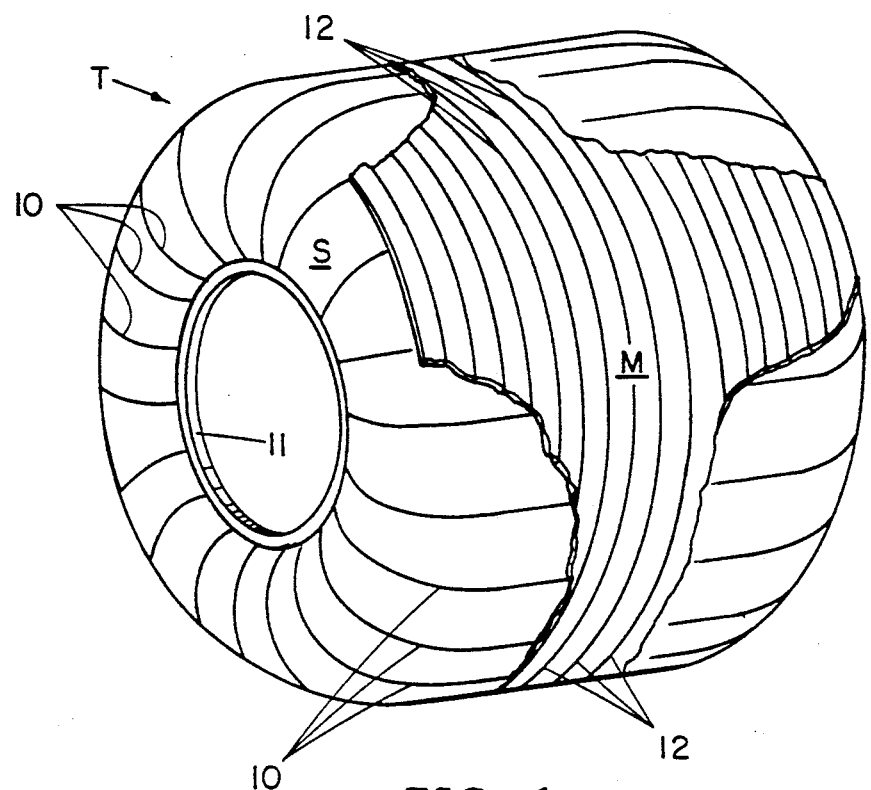
FIG. 1 is an isometric view of a high flotation, low pressure tire of radial construction of the prior art.

Referring first to FIG. 1, there is shown a high flotation, low pressure tire T of radial construction according to the prior art. Typically, such a tire is built up around an inner form (not shown). With a form in place, one or more layers or plies of radial cords are applied in strips 10. The radial plies are typically applied in strips of parallel tire cords encapsulated in rubber. The tire cords are parallel and adjacent to each other. Woven or knitted tire cord is not normally used in the tire industry because with such construction, the cords would tend to cut on each other during flexure and might also result in voids in the rubber where cords cross and contact each other. Either of these conditions would contribute to tire failure.

The strips 10 of radial tire cord extend radially from one of the circular tire beads 11 along an associated annular sidewall S, longitudinally across the tire cylindrical mid-section M, and radially along the other of the tire sidewalls (not shown) to the other of said circular tire beads (not shown). The ends of these radial strips 10 build up around a circular opening to form the tire beads 11, etc. The beads allow the tire to be mounted on a hub (not shown) for rotation about a longitudinal axle (not shown) which is coaxially disposed with the longitudinal axis of the tire T.

In addition, one more more layers or plies or circumferential tire cord 12 are placed around the cylindrical mid-section M of the tire T. Then a relatively thin tread or "cap" of rubber (not shown) may be applied over the entire outer surface of the tire carcass. A tread may be applied and the rubber cured as required.

The high flotation, low pressure radial tire just described has been very successful in off-road use on soft and/or boggy ground such as found in swamp work, agriculture, desert travel, etc. Such a tire provides maximum flexibility in the walls and tread areas so that the tire conforms to the terrain with minimum disturbance of the terrain. However, since the sidewalls of such tire are made up entirely of radial ply strips 10, contact of the sidewalls with rocks, stumps or other obstacles may result in punctures, fractures, radial rips and the like in the sidewall. The purpose of the present invention is to reduce these possibilities.

Figure 2:
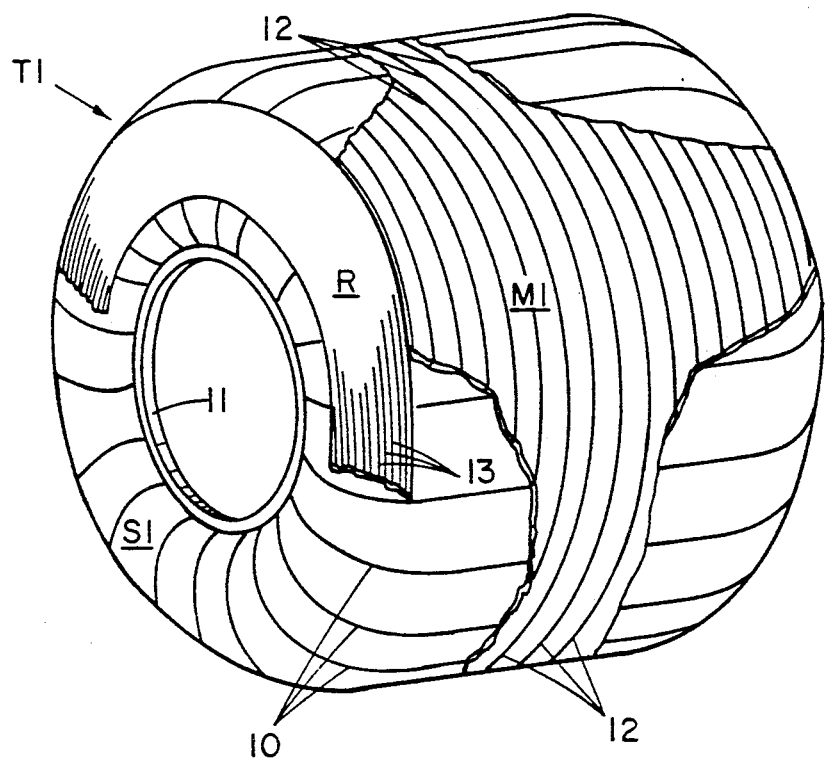
FIG. 2 is a partial isometric view of a high flotation, low pressure tire of radial construction improved, according to a preferred embodiment of the invention, by application of one or more plies of sidewall reinforcing tire cord forming a reinforcing annulus around the sidewalls thereof.
Figure 3:
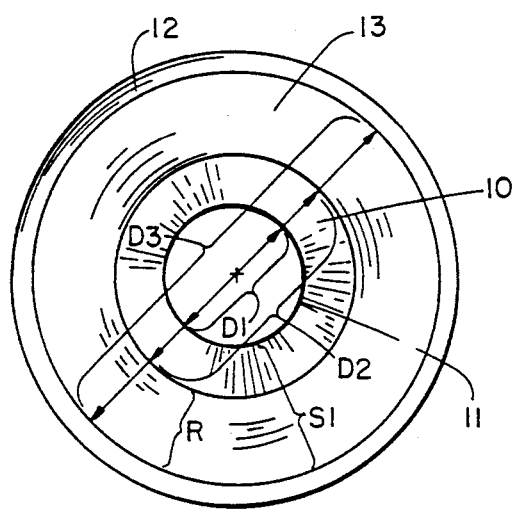
FIG. 3 is a side elevation of a high flotation, low pressure radial tire, according to a preferred embodiment of the invention, illustrating the application and disposition of a reinforcing annulus of sidewall reinforcing tire cord.
Figure 4:
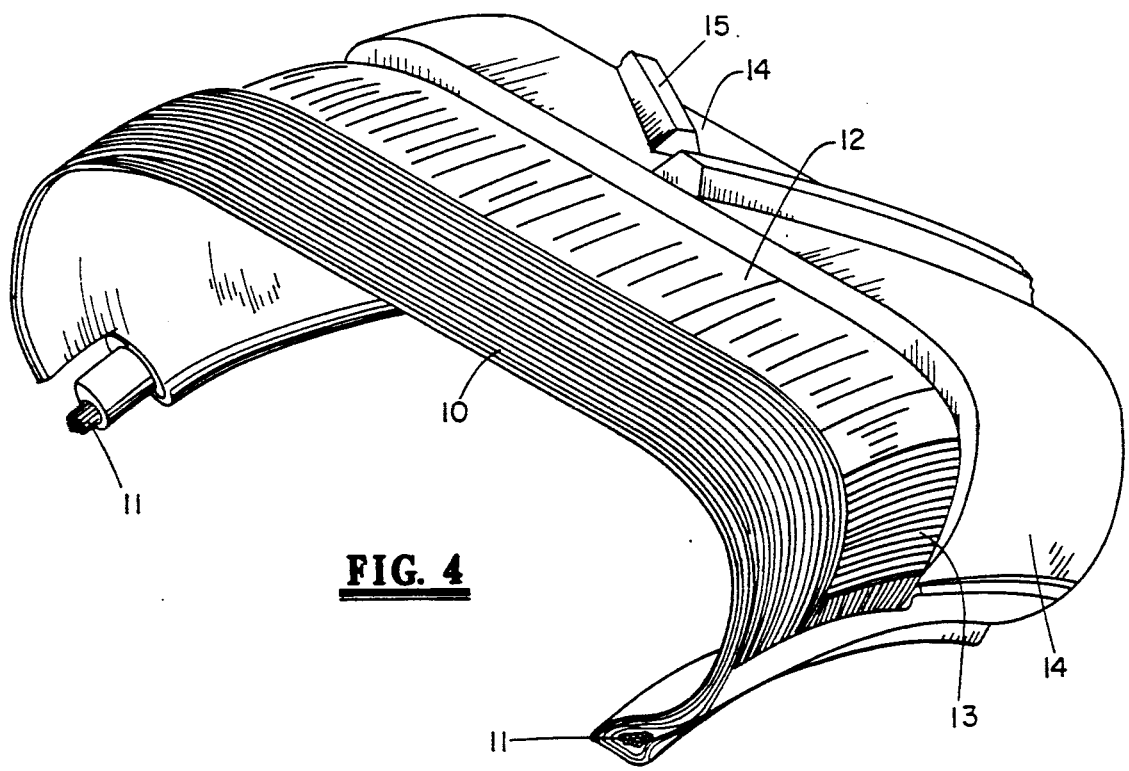
FIG. 4 is a diagramatic perspective, partially cutaway view of an improved high flotation, low pressure radial tire, according to a preferred embodiment of the invention.

Referring now to FIGS. 2, 3 and 4, an improved high flotation, low pressure radial tire T1, will be described, according to a preferred embodiment of the invention. Like the high flotation, low-pressure radial tire of the prior art (FIG. 1), this improved tire T1, is formed of a tire carcass having one or more plies of radial tire cord 10, extending radially from one of the beads 11, along its associated annular sidewall S1, longitudinally across the tires mid-section M1, and radially along the other sidewall (not shown) to the other of the beads (not shown), and one or more plies of circumferentially disposed tire cord 12 surrounding the cylindrical mid-section M1 of the tire. It should be noted that the minor diameter of the sidewalls S1 corresponds with the diameter of the tire beads 11 and is designated in FIG. 3 as D1. The major diameter of the annular sidewalls S1 is adjacent to the ends of the circumferentially disposed tire cords 12, such major diameter being referred to as in FIG. 3 as D3. Thus, the annular sidewalls S1 are defined as the area lying between diameters D1 and D3.

The improved tire T1 of FIGS. 2, 3 & 4, also includes one or more plies of sidewall reinforcing tire cord 13, the cord of which is disposed in a generally circular side-by-side relationship to form a reinforcing annulus R around each of the tire's sidewalls. The major diameter of the reinforcing annulus R is substantially the same as the major diameter D3 of the sidewalls S1. Thus, the outside diameter of the reinforcing annulus R is contiguous to one end of the circumferentially disposed tire cord 12. However, the minor diameter D2 of the reinforcing annulus R is greater than the minor diameter D1 of the sidewalls so that the reinforcing annulus R terminates well short of the tire beads 11. Preferably, the radial width of the reinforcing annulus R is thus fifty to eighty percent of the radial width of the annular sidewalls S1. In a preferred embodiment of the invention, the radial width of the reinforcing annulus R is approximately two-thirds of the radial width of the annular sidewalls S1.

While it is important that the reinforcing annulus provide protection against punctures, fractures, radial rips and the like in the sidewalls, it is equally important that such penetration resistance of the sidewalls be enhanced without otherwise altering the characteristics of the radial tire, specifically characteristics of a high flotation, low pressure radial tire. Thus, it is important that the reinforcing annulus not be secured in any manner to the tire bead and that it stop well short thereof. Specifically, the reinforcing plies of the reinforcing annulus should not materially inhibit flexure of the sidewalls (particularly near the beads) a highly desirable characteristic of high flotation, low pressure radial tires.

Figure 5:
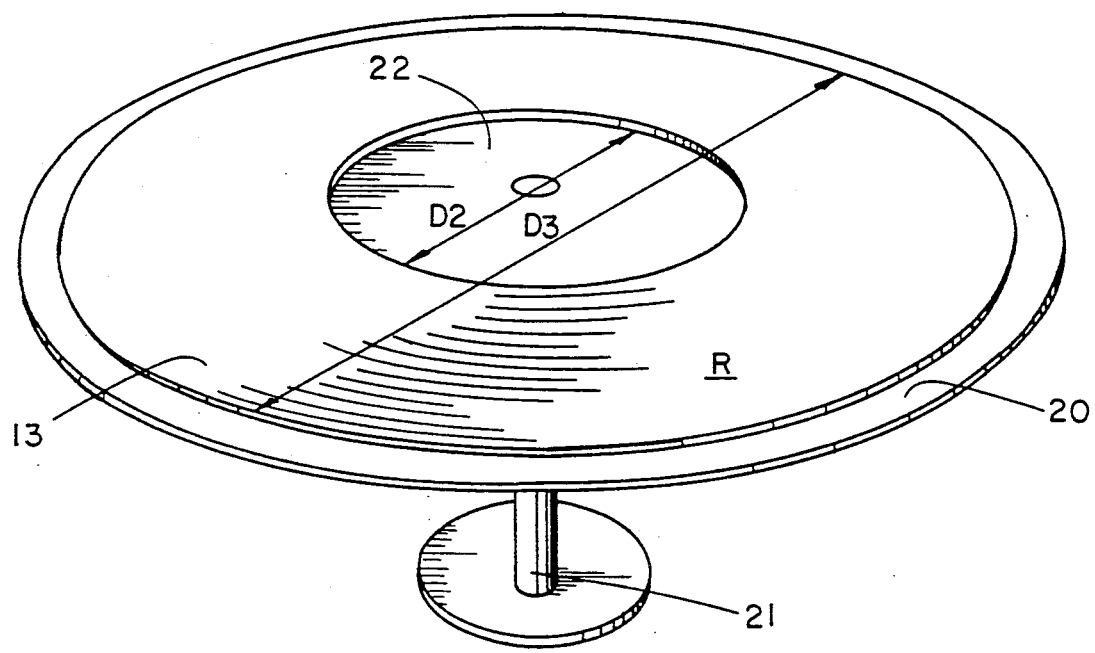
FIG. 5 is a perspective view of apparatus for laying down cords in a spiral pattern to form a reinforcing annulus of sidewall reinforcing tire cord, according to a preferred embodiment of the inventions.
Figure 6:
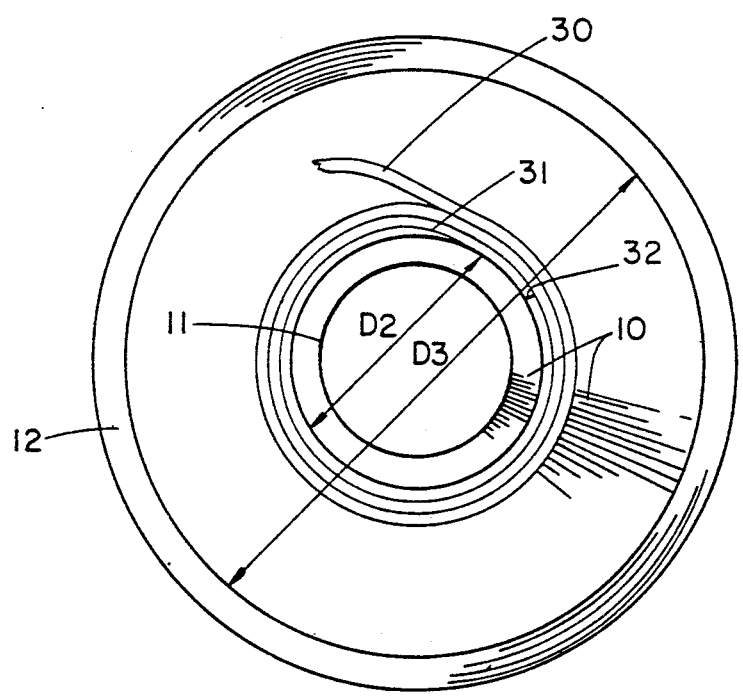
FIGS. 6 & 7 are side elevation views of high flotation, low pressure radial tires, illustrating alternate methods of forming reinforcing annulus of sidewall reinforcing tire cord, according to alternate embodiments of the invention.
Figure 7:
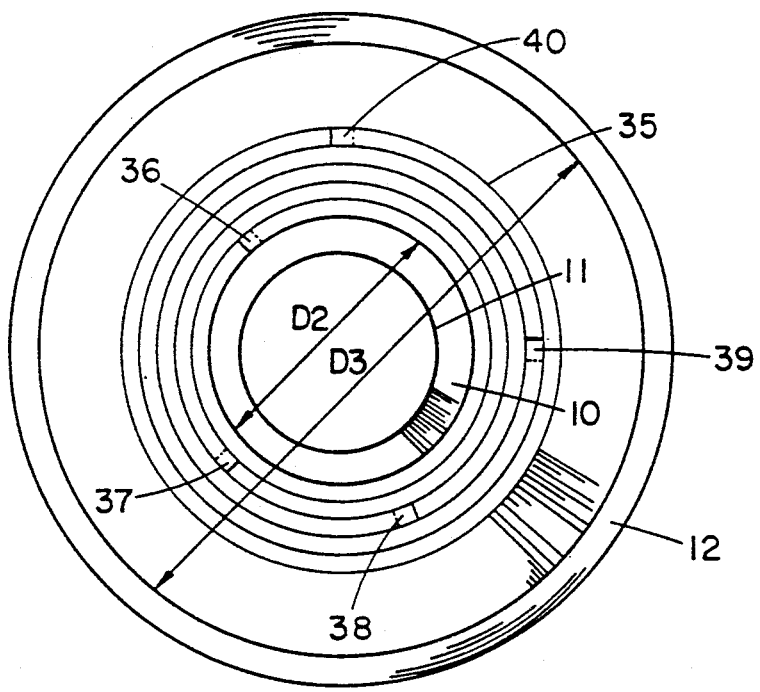

Referring now to FIGS. 5, 6 & 7, three methods of forming the reinforcing annulus of the tires will be described. Referring first to FIG. 5, there is shown a circular table 20, rotably mounted on a stand 21. The table 20 is provided with a removable annular shaped thin metal plate with dimensions approximately D2 and D3 on to which a thin layer of uncured and relatively soft rubber is applied. One continuous tire cord 13 is wound or applied on to the surface of the rubber in a spiral pattern beginning at the major diameter D3 and terminating at the minor diameter D2. The spiral wound configuration may be accomplished by means of a device (not shown) that engages the rotating table and drives a lead screw on which is mounted a carrier/wheel assembly that lays (in a rolling motion) the tire cord on to the rubber. One revolution of the table advances the lead screw one pitch of the lead screw resulting in the tire cord being laid in a plurality of spiral convolutions, parallel and, in effect, uniformly spaced side-by-side at eighteen cords per inch of diameter. After the cord is applied to the rubber on the annular plate, it is covered with an additional thin layer of uncured rubber. The annular spiral tire cord configuaration 13 is sandwiched between two layers of rubber which will encapsulate the tire cord when the tire is cured. This annulus of tire cord and rubber forms the sidewall reinforcement assembly R.

The sidewall reinforcement assembly is transported to the tire in process on the annular metal plate and then affixed to the sidewall S1 of the tire T1 in the disposition illustrated in FIGS. 2, 3 and 4. After the radial plies 10, circumferential plies 12 and annular reinforcing plies 13 are applied, a relatively thin "cap" of rubber 14 is applied over the entire outer surface of the tire carcass, tread or lugs 15 applied and tire rubber cured as required. (See FIG. 4).

An alternate method of applying a reinforcing annulus is illustrated in FIG. 6. In this method, tire cord is laid side by side, calendered in rubber, and cut into strips so that the strips contain a plurality of individual cords parallel to each other, e.g. eighteen cords per inch of width. Then the strip 30 is applied to the sidewall of the tire T1 is a spiral manner, beginning from the minor diameter D2 out to the major diameter D3. To minimize offset of the strip 30 at the minor diameter D2, the starting end 31 may be cut at a large angle. Some overlap joints 32 may be required if the strip 30 is not long enough to complete the spiral pattern along the sidewalls. After the strips 30 are applied, they will form a ply of tire cord 13 and make up the reinforcing annulus R in FIGS. 2, 3 and 4.

Another method of applying reinforcing tire cord for a reinforcing annulus is illustrated in FIG. 7. In this method, the same type of strips 35, such as the strips 30 in FIG. 6, are applied to the tire sidewall S1. However, in this method, the strips 35 are applied in a pattern of progressively larger concentric circles, all strips being contiguous, beginning from the minor diameter D2 toward the major diameter D3. In this method, of course, an overlap joint 36, 37, 38, 39, 40, etc., will be required for each circle. The joints are in a staggered pattern so that the overlap joint in one circle will not be next to the overlap joint in an adjacent concentric circle. All of the circles together form a ply of reinforcing tire cord 13 or annulus R.

Whether the tire cords are spirally disposed as in the method described with reference to FIGS. 5 and 6 or disposed in concentric circles as in FIG. 7, the tire cord of the reinforcing annulus R are disposed in a generally circular side-by-side relationship. Thus, the term "generally circular" as used in the specification and claims is intended to encompass both spirally wound cords and concentric circle cords.

Figure 8:
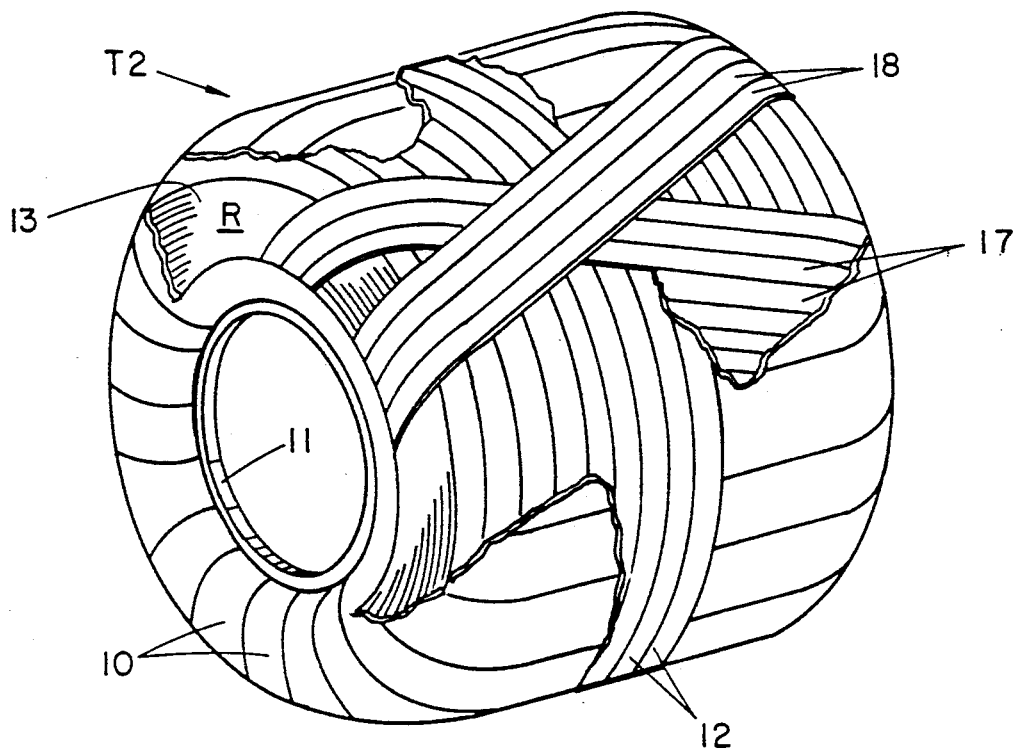
FIG. 8 is an isometric view of a high flotation, low pressure radial tire showing additional plies of sidewall reinforcing tire cord, according to still another embodiment of the invention.

Referring now to FIG. 8, another alternate embodiment of the invention will be described. In this embodiment, as in the embodiment of FIG. 2, the tire T2 includes one or more plies of radial tire cord 10, one or more plies of circumferentially disposed tire cord 12 and one or more plies of sidewall reinforcing tire cord 13. In addition, the tire T2 includes at least another ply of reinforcing tire cord 17 which extends from near the minor diameter of one of the reinforcing annuli, along its associated sidewall, across the tire mid-section, along the other of the sidewalls to near the minor diameter of the other of reinforcing annuli (not shown). Still another ply of reinforcing tire cords 18 extends from near the minor diameter of the reinforcing annulus R, along its associated sidewall, across the mid-section of the tire, and along the other of the sidewalls to near the minor diameter of the other reinforcing annuli (not shown). The cords of each of the plies 17 and 18 are biased, with respect to radial tire cords 10, but in mutually opposed directions. The angle of bias is preferably in a range of from twenty to forty degrees. As with the reinforcing annulus ply 13, these additional reinforcing plies 17 and 18 terminate well short of the tire bead 11. Thus, they provide sidewall penetration protection in the most susceptible area, yet do not materially inhibit flexure of the sidewalls (particularly near the beads 11), leaving the tire to function with the desired characteristics of a radial tire.

Thus, the present invention provides an improved high flotation, low pressure radial tire with greatly reinforced sidewalls. Reinforcement is provided to the most susceptible portion of the sidewall without connecting the reinforcing plies to the tire bead so as not to inhibit the radial characteristics of the tire. While this construction may result in a slightly more expensive tire than those of the prior art; it results in a tire in which the life is substantially extended for severe uses, particularly in the lumber or timber industry.

Several embodiments of the invention have been described herein. However, many variations of the invention can be made without departing from the spirit thereof. Accordingly, it is intended that the scope of the invention be limited only by the claims which follow:

I claim:

1. An improved high flotation, low pressure radial tire having a substantially cylindrical mid-section at opposite ends of which are annular sidewalls which terminate at circular tire beads for mounting said tire on a hub for rotation about a longitudinal axis, said tire being formed of a tire carcass having one or more plies of radial tire cord extending radially from one of said beads along one of said side walls, longitudinally across said mid-section and radially along the other of said sidewalls to the other of said beads; and one or more plies of circumferentially disposed tire cord surrounding said mid-section, the improvement comprising one or more plies of sidewall reinforcing tire cord, the cord of which is wound in a continuous side-by-side spiral relationship to form a reinforcing annulus around each of said sidewalls, the major diameter of said reinforcing annulus being substantially the same as the major diameter of said sidewalls so that the outer periphery of said reinforcing annulus is contiguous to one end of said one or more of said plies of circumferentially disposed tire cord, the minor diameter of said reinforcing annulus being greater than the minor diameter of said sidewalls so that the radial width of said reinforcing annulus is fifty percent to eighty percent of the radial width of said annular sidewalls, said reinforcing annulus thereby terminating well short of said tire beads.

2. The improved radial tire of claim 1 in which the radial width of said reinforcing annulus is approximately two thirds of the radial width of said annular sidewalls.

3. The improved radial tire of claim 1 including: another ply of reinforcing tire cord which extends from near the minor diameter of one of said reinforcing annuli, along its associated sidewall, across said mid-section, along the other of said sidewalls, to near the minor diameter of the other of said reinforcing annuli; and still another ply of reinforcing tire cord which extends from near the minor diameter of one of said reinforcing annuli, along its associated sidewall, across said mid-section, along the other of said sidewalls, to near the minor diameter of the other reinforcing annuli; the cords of each of said another and said still another ply of reinforcing tire cord being biased along said sidewalls, with respect to said radial tire cords, but in mutually opposed directions.

4. The improved radial tire of claim 3 in which the angle of bias between the cords of either said another ply of reinforcing tire cord, or said still another ply of reinforcing tire cord, and said radial tire cords is in a range of from twenty to forty degrees.

* * * * *